(12) United States Patent
Baker et al.

(10) Patent No.: US 8,006,581 B2
(45) Date of Patent: Aug. 30, 2011

(54) DRIVE GEAR ASSEMBLY

(75) Inventors: Edmund Joseph Baker, Campbelltown (AU); Robert John Davey, Mangerton (AU)

(73) Assignee: Engineering Science & Technology Pty. Ltd., New South Wales (AU)

( * ) Notice: Subject to any disclaimer, the term of this patent is extended or adjusted under 35 U.S.C. 154(b) by 0 days.

(21) Appl. No.: 11/575,278

(22) PCT Filed: Sep. 14, 2005

(86) PCT No.: PCT/AU2005/001393
§ 371 (c)(1),
(2), (4) Date: Jun. 28, 2007

(87) PCT Pub. No.: WO2006/029454
PCT Pub. Date: Mar. 23, 2006

(65) Prior Publication Data
US 2008/0034904 A1    Feb. 14, 2008

(30) Foreign Application Priority Data

Sep. 14, 2004  (AU) .............................. 2004905338

(51) Int. Cl.
*F16H 35/06* (2006.01)
(52) U.S. Cl. .......................................... 74/397; 74/399
(58) Field of Classification Search ................ 74/395, 74/396, 397, 398, 409, 399, 401, 402, 403, 74/89.36
See application file for complete search history.

(56) References Cited

U.S. PATENT DOCUMENTS
6,860,829 B2 * 3/2005 Bock et al. .................. 475/18

FOREIGN PATENT DOCUMENTS
| | | |
|---|---|---|
| DE | 2631139 | 1/1978 |
| DE | 3209175 A1 | 9/1983 |
| DE | 3705982 | 9/1988 |
| EP | 0280776 | 9/1988 |
| FR | 2032831 A | 11/1970 |
| GB | 1397295 A * | 6/1975 |
| RU | 2025616 | 12/1994 |
| WO | 00/63587 | 10/2000 |

OTHER PUBLICATIONS

International Search Report (from the Australian Patent Office).
05779857 European Search Report.

* cited by examiner

*Primary Examiner* — Thomas R Hannon
*Assistant Examiner* — Alan Waits
(74) *Attorney, Agent, or Firm* — Michael Best & Friedrich LLP

(57) ABSTRACT

A drive gear assembly is disclosed. The assembly includes a drive shaft (11) and a drive gear (9) mounted on or integral with a drive shaft and rotatable therewith and being adapted to mesh with a driven gear (7). The assembly also includes a self-aligning assembly that supports the drive shaft for rotation about an axis of the drive shaft and so that the drive gear can self-align with respect to the driven gear.

14 Claims, 3 Drawing Sheets

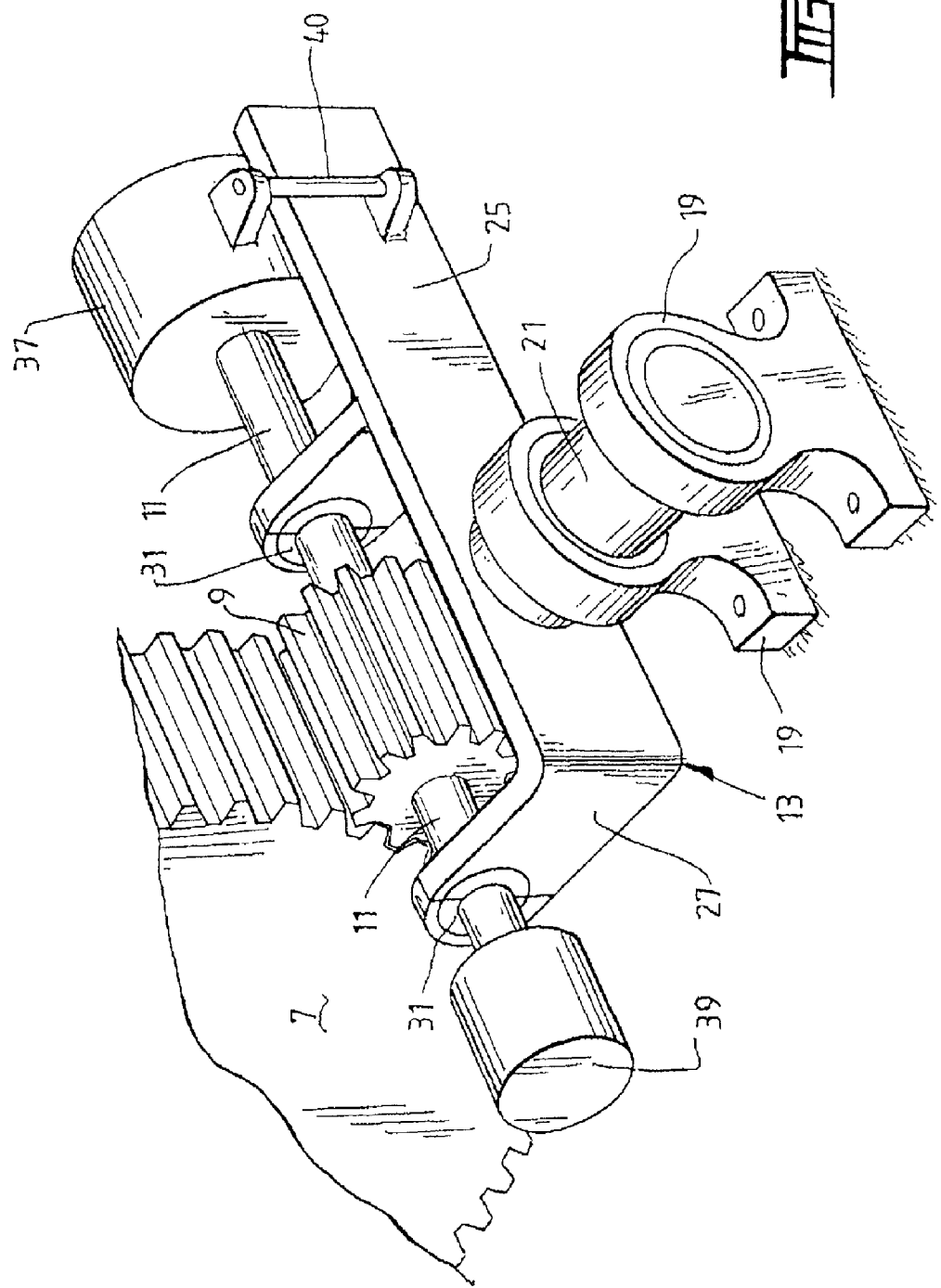

DRIVE GEAR ASSEMBLY

The present invention relates to a drive gear assembly that can transfer drive from a motor, such as an electric motor, to a mechanical system, such as a grinding mill.

Many mechanical systems are driven by motors (eg. electric, steam, hydraulic, diesel, etc). In order to utilise the power available from a motor it is necessary to transfer the power from the motor to a mechanical system coupled to the motor. Typically, power transfer is achieved by connecting a drive shaft of a motor to a drive gear assembly which includes a drive gear, such as a pinion, and meshing the drive gear with a driven gear, such as a gear wheel, that is connected in some way to the mechanical system.

In practice, it is important that the motor, the mechanical system, and the mechanical components that couple together the motor and the mechanical system each be properly aligned so that the gear teeth of the drive gear and the gear teeth of the driven gear mesh to within fine tolerances. Failure to do this, irrespective of whether the gears are spur gears or helical gears or any other types of gears, often results in excessive wear of the gear teeth, leading in the worst cases to failure of the gears as a result of breakage of the teeth. In addition, misalignment of gear teeth can also result in significant vibration that often produces other adverse outcomes, such as fatigue loads on various components of the mechanical system.

In the case of spur gears, by way of example, in order to be properly aligned it is necessary that the gear teeth of the drive gear be parallel with the gear teeth of the driven gear. More generally, it is necessary for the axes of rotation of the drive gear and the driven gear to be parallel to their axes of generation. It is also desirable that the backlash of the gears be an optimum for the particular gears. If the gears are set with a backlash of zero, ie. are positioned such that the teeth mesh fully and are hard up against one another to the fullest extent, the gears generally will produce excessive tooth loads and thus will not produce design life.

In order to achieve proper alignment it is also necessary that the motor drive shaft and the drive gear be aligned.

One known approach for achieving proper alignment is to physically move the motor and/or the drive gear assembly to accurately align the motor shaft and the drive gear assembly in order to achieve close tolerance meshing of the gear teeth.

In this approach the task of providing fine tolerances in the meshing gear teeth is largely achieved by "trial and error" adjustment of the position of the motor and the drive gear assembly. It is often a difficult and time-consuming task. This is especially true with large motors and heavy drive gears.

The problem in large measure arises because small movements in the location of the motor or the drive gear assembly can have a significant impact on the alignment. Therefore, great care and judgement is required in order to achieve alignment with minimum effort. By way of example, large motors and grinding mills with large girth gears and pinions can take several days to align.

The task is further complicated by the fact that in many situations excellent alignment of a drive gear assembly in the "cold" or "unloaded" condition does not correspond to satisfactory alignment when the mechanical system is loaded. This is due to distortion of the drive gear assembly under load and other factors. As a consequence, further adjustment of the alignment of the motor and/or the drive gear assembly is often required to achieve satisfactory meshing of the gear teeth under load.

An alternative known approach for achieving proper alignment is based on:

(a) supporting a drive gear on a spherical bearing so that the drive gear can self-align with respect to the driven gear by rotating about a centre of the bearing, typically with a rocking or wobbling motion; and
(b) transferring power to the drive gear from a motor drive shaft via a central geared coupling.

Two known self-aligning drive gear assemblies in accordance with this approach are manufactured by Krupp-Polysius and J & E Hofmann Engineering.

The above-described self aligning drive gear assemblies have a number of disadvantages.

Firstly, the minimum size of the drive gears is dictated by the size of the internal geared couplings and this often results in significantly larger drive gears than are otherwise required.

Furthermore, the particular form of the spherical bearings that can be used in the gear assemblies is generally not a standard off-the-shelf item and, moreover, generally has limited thrust capacity in the current configuration.

Furthermore, misalignment of the drive gears and the driven gears that can be accommodated is limited to the allowable angular misalignment of the internal geared couplings and usually this is relatively small.

Furthermore, it is still necessary to align the drive gears to the motor drive shafts.

An alternative known approach for achieving proper alignment is disclosed in International application PCT/AU00/00332 (WO 00/63587) in the name of the applicant. The International application discloses a drive gear assembly that includes:

(a) a drive gear that is adapted to mesh with a driven gear, the drive gear and the driven gear each having an axis about which the gears can rotate;
(b) a self-aligning bearing that supports one of the drive gear or the driven gear and allows it to rotate, typically with a rocking or wobbling motion, around a centre of the bearing so that the drive gear can self-align with respect to the driven gear or vice versa;
(c) at least one flexible coupling that is coupled to the drive gear and, in use of the drive gear assembly, is also coupled directly or indirectly to the drive shaft of a motor so that power from the motor can be transferred to the driven gear, which flexible coupling or couplings allow the axis of the drive gear to be positioned out of alignment with the axis of the drive shaft; and
(d) an assembly that supports the self-aligning bearing and allows the self-aligning bearing to be moved relative to the axis of the drive shaft.

The above-described drive gear assembly is a significant improvement over the other self-aligning drive gear assemblies described above and operates well in most applications.

An object of the present invention is to provide an alternative self-aligning drive gear assembly to that described in the International application.

In general terms, the present invention provides a drive gear assembly that includes:

(a) a drive shaft;
(b) a drive gear mounted on or integral with a drive shaft and rotatable therewith and being adapted to mesh with a driven gear; and
(c) a self-aligning assembly that supports the drive shaft for rotation about an axis of the drive shaft and so that the drive gear can self-align with respect to the driven gear.

Preferably the self-aligning assembly is arranged to pivot about an axis, hereinafter referred to as "the pivot axis", which is:

(a) perpendicular to the drive shaft axis;
(b) in a plane that;

(i) passes through a midpoint of an active face width of the drive gear and the driven gear; and
(ii) is perpendicular to the drive shaft axis; and
(c) if projected, passes through or close to a pitch point of the drive gear and the driven gear at the mid point of the active face width.

The above-described arrangement of the pivot axis of the self-aligning assembly is particularly advantageous in relation to helical gears because it means that the axial force generated by helical gears will have zero or neglible moment about the pivot axis.

The pivot axis may be at any angle through the pitch point except for an angle in which the pivot axis is parallel to a line of action of the drive gear assembly.

Preferably, from the viewpoint of controlling tip to root interference of gear teeth, the pivot axis is on or at a small angle to a line joining the centres of the drive gear and the driven gear.

The term "pitch point" is understood herein to mean the point of tangency between the two operating pitch circles of a drive gear and a driven gear.

The term "active face width" is understood herein to mean the length, in an axial direction, of that part of the teeth of one gear which bears upon the teeth of another meshing gear. The active face width is usually the width of the narrower of the two gears.

Preferably the drive shaft extends from opposite ends of the drive gear and the self-aligning assembly and includes a support shaft mounted for rotation about the pivot axis and a support member mounted to the support shaft and to the drive shaft at opposite ends of the drive shaft.

The self-aligning assembly described in the preceding paragraph allows the drive gear to rotate clockwise or anti-clockwise about the pivot axis of the support shaft and this movement facilitates self alignment of the drive gear with respect to the driven gear.

Preferably the support member is in the form of a yoke that includes a base and two arms extending from opposite ends of the base, with the base being coupled to the support shaft and the arms being coupled to the drive shaft of the drive gear assembly at opposite ends of the drive gear of the drive gear assembly.

Preferably the arms are coupled to the drive shaft of the drive gear assembly via a pair of eccentric bearing cartridges that are carried by the arms. With this arrangement the drive shaft extends through the eccentric bearing cartridges. The eccentric bearing cartridges accommodate adjustments for backlash and misalignment of the drive gear with respect to the driven gear.

Preferably the yoke is C-shaped.

The drive gear assembly may further include one or more than one drive motor mounted on the drive shaft and operable to rotate the drive shaft and the drive gear.

Alternatively, the drive gear assembly may further include a coupling that is flexibly coupled to the drive shaft of the drive gear and, in use of the drive gear assembly, is also flexibly coupled directly or indirectly to the drive shaft of a drive motor so that power from the motor can be transferred to the driven gear, which coupling allows the axis of the drive gear to be positioned out of alignment with the axis of the drive shaft.

Preferably the coupling that couples the drive shafts of the drive gear and the motor is a flexible coupling.

The flexible coupling may be any suitable form of power transmitting coupling that can accept angular misalignment, such as universal joints, constant velocity joints, Hookes joints, gear couplings, rubber bush couplings or flexible diaphragm couplings. In fact, any form of flexible power transmitting coupling may be used.

The drive motor may be any motor that can drive the drive shaft and the drive gear of the drive gear assembly.

The drive motor may be any suitable type, such as hydraulic, steam, electric, diesel, etc.

In a situation in which the drive motor is mounted directly to the drive shaft, preferably the drive motor is an hydraulic motor.

In a situation in which the drive motor is mounted to the drive shaft via the coupling, preferably the drive motor is an electric motor.

The drive gear and the driven gear may be any suitable gears.

By way of example, the drive gear and the driven gear may be gear wheels of suitable gear tooth profile, such as spur gear and helical gear profiles.

The most common embodiment of the invention has the drive gear as a pinion.

The driven gear may form part of any suitable system. By way of example, the mechanical system may be a pinion drive to a grinding mill girth gear.

According to the present invention there is also provided a motor-driven mechanical system that includes the above-described drive gear assembly.

The present invention is described further by way of example with reference to the accompanying drawings, of which:

FIG. 4 shows the general arrangement of another embodiment of a drive gear assembly in accordance with the present invention.

The embodiments of the drive gear assembly shown in the Figures are arranged to transfer power to a driven gear 7 of a mechanical system (not shown).

Figure 1:
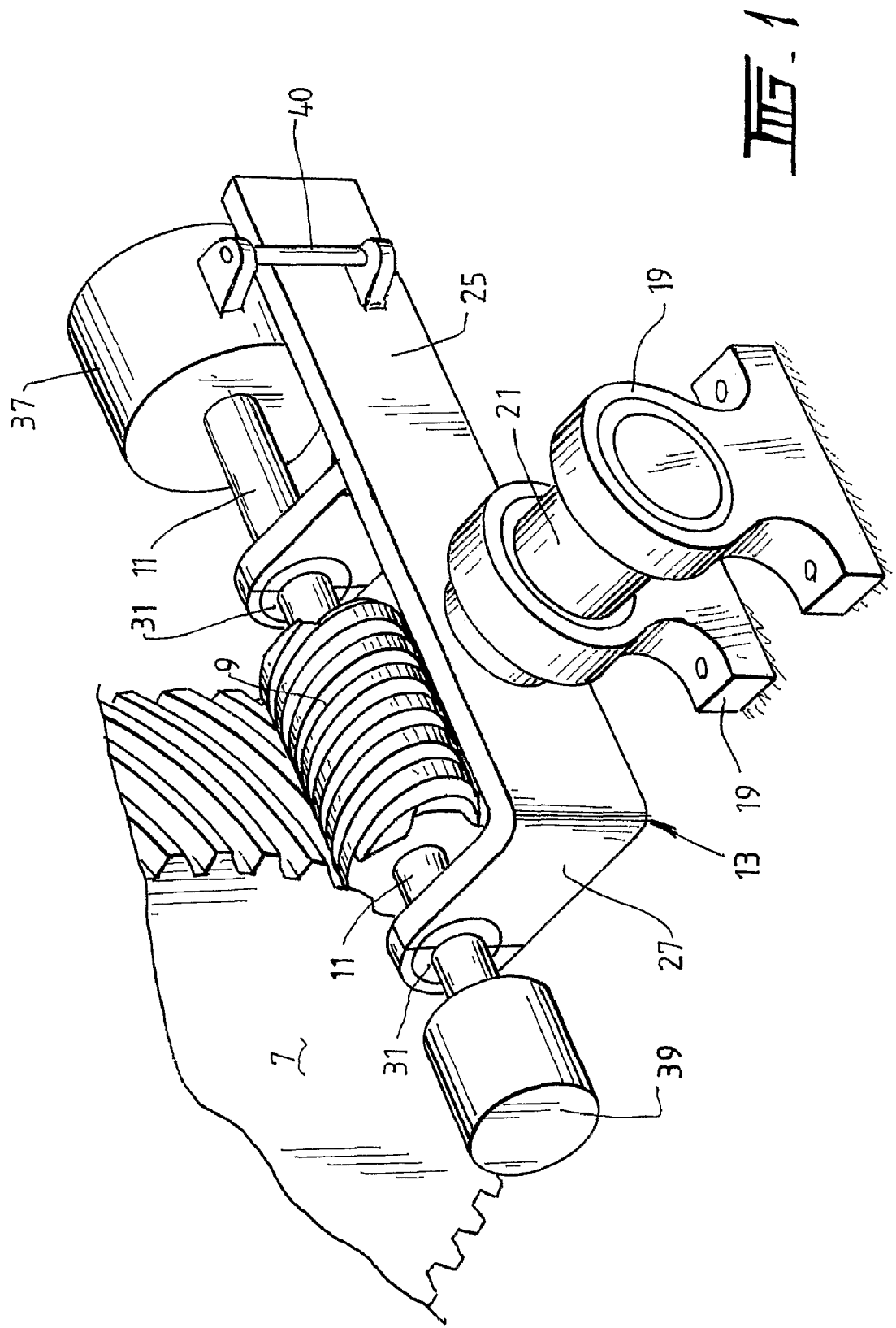
FIG. 1 shows the general arrangement of one embodiment of a drive gear assembly in accordance with the present invention.

The embodiment of the drive gear assembly (which is drawn without a gear case but may have a gear case) shown in FIG. 1 includes a drive gear 9 that has a central bore and external teeth that are adapted to mesh with teeth (not shown) on the driven gear 7.

The drive gear 9 is mounted on a drive shaft 11 that extends through the central bore of the drive gear.

Alternatively, the drive gear assembly may include (i) an integral drive gear 9 and drive shaft 11, i.e the gear and shaft turned and cut out of a single piece of steel/metal or (ii) a drive gear 9 and two stub drive shafts attached to opposite ends of the gear.

The drive gear assembly further includes a drive motor 37 mounted directly onto one end of the drive shaft 11 with a torque restraint device similar in principle to that shown as 40 and a counterweight 39 mounted on the other end of the drive shaft 11. In an alternative embodiment (not shown) the drive gear assembly includes drive motors mounted directly onto opposite ends of the drive shaft 11 and there is no need to provide a counterweight.

The drive gear assembly further includes a self-aligning assembly that supports the drive gear 9, the drive shaft 11, the motor 37, and the counterweight 39 for movement to facilitate alignment of the drive gear 9 with respect to the driven gear 7.

The self-aligning assembly includes two bearing assemblies 19 that are mounted to a fixed support surface, a stub shaft 21 that is supported for rotation about its axis, i.e. a pivot axis, by the bearing assemblies 19, and a C-shaped yoke 23 that is carried by the stub shaft 21 and supports the assembly of the drive shaft 11 and the drive gear 9.

The yoke 23 includes a base 25 and two arms 27 that generally extend perpendicularly from the base 25. Each arm 27 preferably carries an eccentric bearing cartridge 31. The cartridges 31 are aligned and are formed to receive and support opposite ends of the drive shaft 11. Alternatively, conventional bearings and housings can be used.

Figure 3:
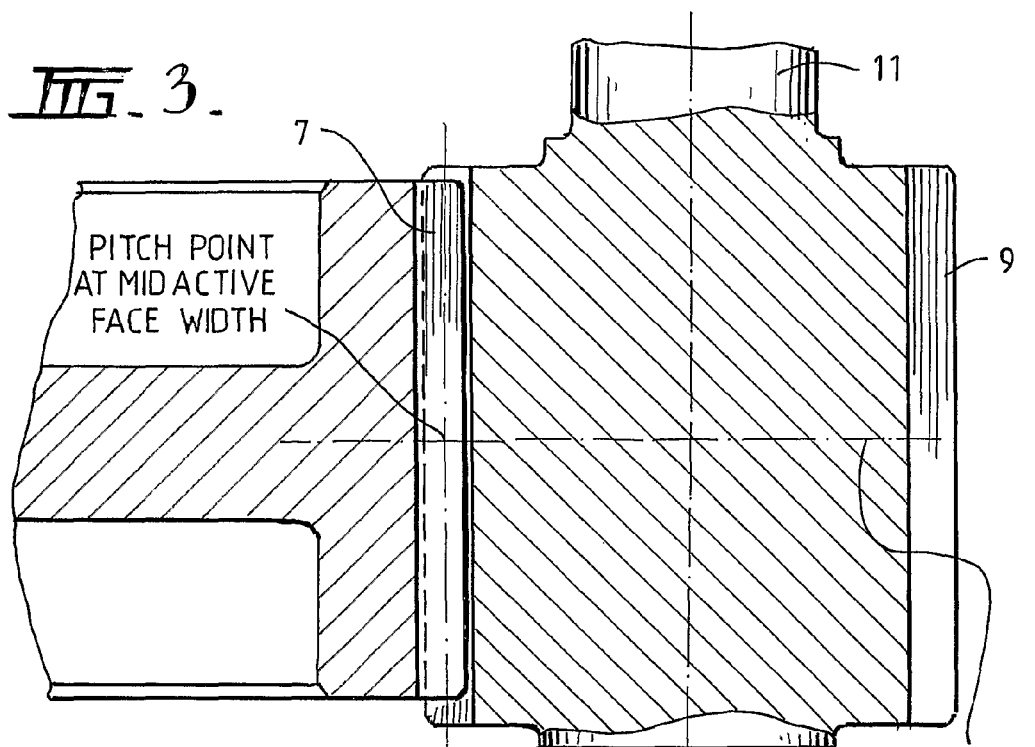
FIG. 3 is a top plan view that further illustrates the pivot axis position.
Figure 2:
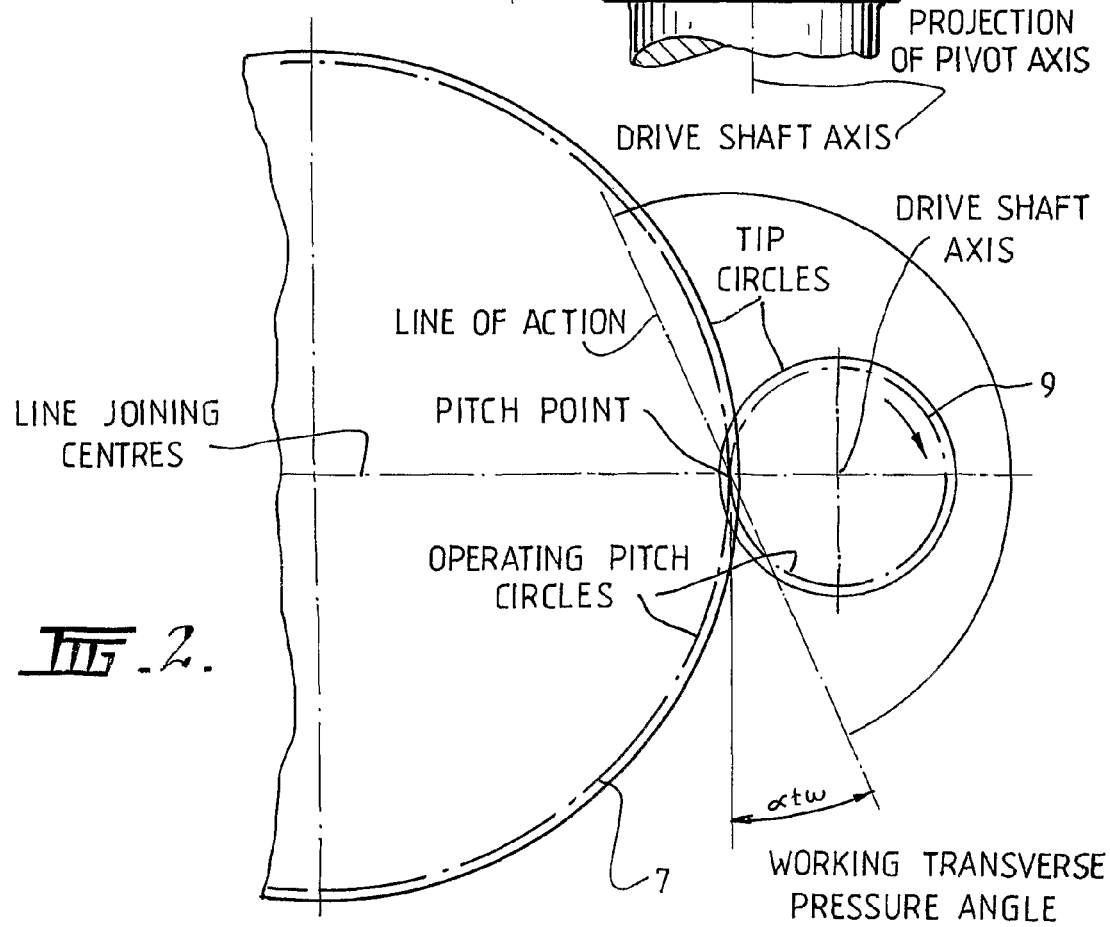
FIG. 2 is an elevation that illustrates the position of a pivot axis of a self-aligning assembly of the drive gear assembly shown in FIG. 1.

With reference to FIGS. 2 and 3, the self-aligning assembly is positioned so that the pivot axis of the stub shaft 21 (and therefore the self-aligning assembly) is perpendicular to the axis of the drive gear 9 and is in a plane that (i) passes through a midpoint of the active face width of the drive gear 9 and the drive gear 7 and (ii) is perpendicular to the axis of the drive gear.

The self-aligning assembly is also positioned so that the pivot axis of the stub shaft 21, if projected, passes through or is close to a pitch point of the drive gear 9 and the driven gear 7 at the midpoint.

It is evident from the above that rotation of the stub shaft 21 in a clockwise or anti-clockwise direction about the pivot axis has the effect of rotating the drive gear 9 in a vertical plane that passes through the longitudinal axis of the drive gear 9. This rotational movement facilitates self-alignment of the drive gear 9 with respect to the driven gear 7.

In addition to the above, the eccentric bearing cartridges 31 facilitate adjustments for backlash and a further degree of freedom for movement in a second plane to achieve adjustment of the drive gear 9 with respect to the driven gear 7.

The embodiment of the drive gear assembly shown in FIG. 3 is identical in many respects to the embodiment of the drive gear assembly shown in FIG. 1 and the same reference numerals are used to describe the same structural features of the assemblies.

The main difference between the two embodiments is that the FIG. 4 embodiment does not include the FIG. 1 embodiment arrangement of the drive motor 37 mounted directly onto one end of the drive shaft 11 and instead includes a pair of flexible couplings 13 and an intermediate shaft 15 that interconnect the drive shaft 11 and a drive shaft 17 of the drive motor 37. Another difference between the two embodiments is that FIG. 4 has spur gears 7 and 9 rather than helical gears.

Each embodiment of the drive gear assembly makes it possible:
 (a) to install the drive gear assembly with only approximately correct alignment between the drive gear 9 and the driven gear 7 (and without significant adjustment of the motor beyond that required in the initial installation); and
 (b) to self align the drive gear 9 with respect to the driven gear 7 (at an optimum backlash) that is required to produce fine tolerance meshing with the driven gear 7.

Each embodiment of the drive gear assembly described above has a number of advantages over the known self-aligning drive gear assemblies.

Firstly, each embodiment of the drive gear assembly makes it possible to quickly and easily align drive and driven gears with a required backlash for optimum performance.

Furthermore, each embodiment of the drive gear assembly makes it possible to achieve alignment to a high degree at initial set-up and to maintain the alignment during operation and this minimises wear on gear teeth. This is a particularly important advantage in many situations. For example, in the case of grinding mills, the pinion is generally a quite small diameter gear, with generally less than 30 teeth, whilst the driven girth gear is essentially the diameter of the mill shell, which may result anywhere in the order of 200 to 400 teeth. The simple result of this geometry is that girth gears typically may be up to 8 to 10 times more expensive than pinions. The designer therefore strives to protect the girth gear at the expense of the pinion. Apart from attempting to achieve minimum wear as a result of the quality of the initial alignment, the designer also gives considerable thought to the metallurgy of the girth gear relative to the pinion. The pinion is generally of a somewhat harder material than the girth gear, the differential being premised on a consensus over wear, especially recognising that there will always be less than perfect alignment in a conventional mill situation. This is not the case with the present invention, where essentially perfect alignment is produced. As a result, the designer can contemplate metallurgy which produces harder girth gears and thus less wear in the gears and longer times between replacing the gears, whilst not compromising the overriding imperative of preferentially protecting the more expensive girth gear.

Furthermore, as there is no requirement for an internal gear coupling the diameter of the drive gear 9 can be reduced relative to other known self-aligning pinions.

Furthermore, the drive motor does not require accurate alignment with the drive gear assembly.

Many modifications may be made to the preferred embodiment of the drive gear assembly described above without departing from the spirit and scope of the present invention.

By way of example, whilst each embodiment of the self-aligning assembly shown in the drawings includes two bearing assemblies 19 mounted to the fixed support surface, the present invention is not so limited and extends to arrangements that have one or more than two such bearings.

In addition, the present invention extends to arrangements that include a single bearing assembly of the cross-roller bearing type or other single bearing configurations such as plain bearings, rather than the above-described two or more bearing assemblies 19 and the rotational support system for the stub shaft 21.

Furthermore, the present invention extends to combinations of the above-described bearing assemblies.

In addition, whilst each embodiment of the self-aligning assembly shown in the drawings includes two bearing assemblies 19 mounted to the fixed support surface, the stub shaft 21, and the C-shaped yoke 23, the present invention is not so limited and extends to any suitable arrangements that allows movement of the drive gear 9 with respect to the driven gear 7 to facilitate self-alignment of the gear.

The invention claimed is:

1. A motor-driven mechanical system comprising a drive gear assembly that includes:
 (a) a drive shaft;
 (b) a drive gear, either spur or helical, mounted on or integral with the drive shaft and rotatable therewith and being adapted to mesh with a spur or helical driven gear, the drive shaft extending from opposite ends of the drive gear; and
 (c) a self-aligning assembly that supports the drive shaft for rotation about an axis of the drive shaft and so that the drive gear can self-align with respect to the driven gear, the self-aligning assembly being arranged to pivot about a pivot axis, wherein the pivot axis is:
  (i) perpendicular to the drive shaft axis;
  (ii) in a plane that passes through a midpoint of an active face width of the drive gear and the driven gear and is perpendicular to the drive shaft axis; and (iii) passes through a pitch point of the drive gear and the driven gear at the midpoint of the active face width; and (d) the self-aligning assembly includes a support shaft mounted for rotation about the pivot axis and a support member mounted to the support shaft and to the drive shaft at opposite ends of the drive shaft, and wherein the support member is in the form of a yoke that includes a base and two arms extending from opposite ends of the base, with the base being coupled to the support shaft and the arms being coupled to the drive shaft at opposite ends of the drive shaft, and wherein the arms are coupled to the drive shaft via a pair of eccentric bearing cartridges that are carried by the arms.

2. The mechanical system defined in claim 1 wherein the pivot axis is at any angle through the pitch point except for an angle in which the pivot axis is parallel to a line of action of the drive gear assembly.

3. The mechanical system defined in claim 1 wherein the yoke is C-shaped.

4. The mechanical system defined in claim 1 further including one or more than one drive motor mounted on the drive shaft and operable to rotate the drive shaft and the drive gear.

5. The mechanical system defined in claim 1, wherein the drive gear is a single helical gear and the driven gear is a single helical gear.

6. A drive gear assembly that includes:
(a) a drive shaft;
(b) a drive gear, either spur or helical, mounted on or integral with the drive shaft and rotatable therewith and being adapted to mesh with a spur or helical driven gear, the drive shaft extending from opposite ends of the drive gear; and
(c) a self-aligning assembly that supports the drive shaft for rotation about an axis of the drive shaft and so that the drive gear can self-align with respect to the driven gear, the self-aligning assembly being arranged to pivot about a pivot axis, wherein the pivot axis is:
(i) perpendicular to the drive shaft axis;
(ii) in a plane that passes through a midpoint of an active face width of the drive gear and the driven gear and is perpendicular to the drive shaft axis; and
(iii) passes through a pitch point of the drive gear and the driven gear at the midpoint of the active face width; and (d) the self-aligning assembly includes a support shaft mounted for rotation about the pivot axis and a support member mounted to the support shaft and to the drive shaft at opposite ends of the drive shaft, and wherein the support member is in the form of a yoke that includes a base and two arms extending from opposite ends of the base, with the base being coupled to the support shaft and the arms being coupled to the drive shaft at opposite ends of the drive shaft, and wherein the arms are coupled to the drive shaft via a pair of eccentric bearing cartridges that are carried by the arms.

7. The drive gear assembly defined in claim 6 wherein the pivot axis is at any angle through the pitch point except for an angle in which the pivot axis is parallel to a line of action of the drive gear assembly.

8. The drive gear assembly defined in claim 6 wherein the yoke is C-shaped.

9. The drive gear assembly defined in claim 6 further including one or more than one drive motor mounted on the drive shaft and operable to rotate the drive shaft and the drive gear.

10. The drive gear assembly defined in claim 6 further including a coupling that is coupled to the drive shaft of the drive gear and, in use of the drive gear assembly, is also coupled directly or indirectly to the drive shaft of a drive motor so that power from the motor can be transferred to the driven gear, which coupling allows the axis of the drive gear to be positioned out of alignment with the axis of the drive shaft.

11. The drive gear assembly defined in claim 10 wherein the coupling that couples the drive shafts of the drive gear and the motor is a flexible coupling.

12. The drive gear assembly defined in claim 11 wherein the flexible coupling is any suitable form of power transmitting coupling that can accept angular misalignment.

13. The drive gear assembly defined in claim 6 wherein the drive gear and the driven gear include gear wheels of suitable gear tooth profile.

14. The drive gear assembly defined in claim 6, wherein the drive gear is a single helical gear and the driven gear is a single helical gear.

* * * * *